United States Patent
Gredinberg et al.

(10) Patent No.: US 6,898,050 B2
(45) Date of Patent: May 24, 2005

(54) HYDRODYNAMIC BEARING MOTOR HAVING A MOLDED PLASTIC HUB

(75) Inventors: Alexander Gredinberg, San Jose, CA (US); Jerry Joseph Weingord, Scotts Valley, CA (US); Sanjay Champaklal Sheth, Sunnyvale, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 43 days.

(21) Appl. No.: 10/340,248

(22) Filed: Jan. 10, 2003

(65) Prior Publication Data

US 2003/0156353 A1 Aug. 21, 2003

Related U.S. Application Data

(60) Provisional application No. 60/358,690, filed on Feb. 21, 2002.

(51) Int. Cl.$^7$ .............................................. G11B 17/08
(52) U.S. Cl. ............................... 360/98.08; 360/99.08; 360/99.12
(58) Field of Search ........................... 360/98.08, 99.12, 360/98.07, 99.08

(56) References Cited

U.S. PATENT DOCUMENTS

| | | | |
|---|---|---|---|
| 5,493,462 A | * | 2/1996 | Peter ........................ 360/99.12 |
| 6,501,617 B1 | * | 12/2002 | Harada et al. ............ 360/99.08 |
| 6,556,376 B1 | * | 4/2003 | Boutaghou ............... 360/99.12 |
| 6,756,715 B2 | * | 6/2004 | Hirose et al. .............. 310/90 |

* cited by examiner

Primary Examiner—A. J. Heinz
(74) Attorney, Agent, or Firm—Morrison & Foerster LLP

(57) ABSTRACT

A single plate hydrodynamic bearing motor comprising an integrated hub and shaft assembly. The hub is formed of molded plastic and at least one disk is affixed to the hub.

11 Claims, 2 Drawing Sheets

HYDRODYNAMIC BEARING MOTOR HAVING A MOLDED PLASTIC HUB

CROSS REFERENCE TO RELATED APPLICATIONS

This application claims the priority of U.S. Provisional Application No. 60/358,690, filed Feb. 21, 2002 by Gredinberg et al. (entitled "Ultra Low Cost Single Plate FDB Motor"), which is herein incorporated by reference.

FIELD OF THE INVENTION

The invention relates to hydrodynamic bearing motors, and more specifically to a hydrodynamic bearing motor having a molded plastic hub.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. For example, to achieve increased storage densities, the read/write heads must be placed increasingly close to the surface of the storage disk. This proximity requires that the disk rotate substantially in a single plane. A slight wobble or run-out in disk rotation can cause the surface of the disk to contact the read/write heads. This is known as a "crash" and can damage the read/write heads and surface of the storage disk, resulting is loss of data.

From the foregoing discussion, it can be seen that the bearing assembly that supports the storage disk is of critical importance. One typical bearing assembly comprises ball bearings supported between a pair of races that allow a hub of a storage disk to rotate relative to a fixed member. However, ball bearing assemblies have many mechanical problems, such as wear, run-out and manufacturing difficulties. Moreover, resistance to operating shock and vibration is poor because of low damping.

One alternative bearing design is a hydrodynamic bearing. In a hydrodynamic bearing, a lubricating fluid such as oil provides a bearing surface between a fixed member of the housing and a rotating member of the disk hub. Hydrodynamic bearings spread the bearing surface over a large surface area, as opposed to a ball bearing assembly, which comprises a series of point interfaces. This is desirable because the increased bearing surface reduces wobble or run-out between the rotating and fixed members. Further, the use of fluid in the interface area imparts damping effects to the bearing, which helps to reduce non-repeat run-out.

A traditional design in the field of hydrodynamic bearing motors is the "single plate" design, in which axial stiffness is provided by two equally opposing thrust bearings positioned on the motor's shaft, and the bearing lubricant is retained by closing one bearing end and placing a capillary seal at the opposing end. This motor design is desirable for its improved angular stiffness and dynamic performance; however, manufacturing can be costly.

Therefore, a need exists for a single plate hydrodynamic bearing motor that can be manufactured at a low cost.

SUMMARY OF THE INVENTION

The invention provides a single plate hydrodynamic bearing motor comprising an integrated hub and shaft assembly, wherein the hub is formed of molded plastic and at least one disk is affixed to the hub.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
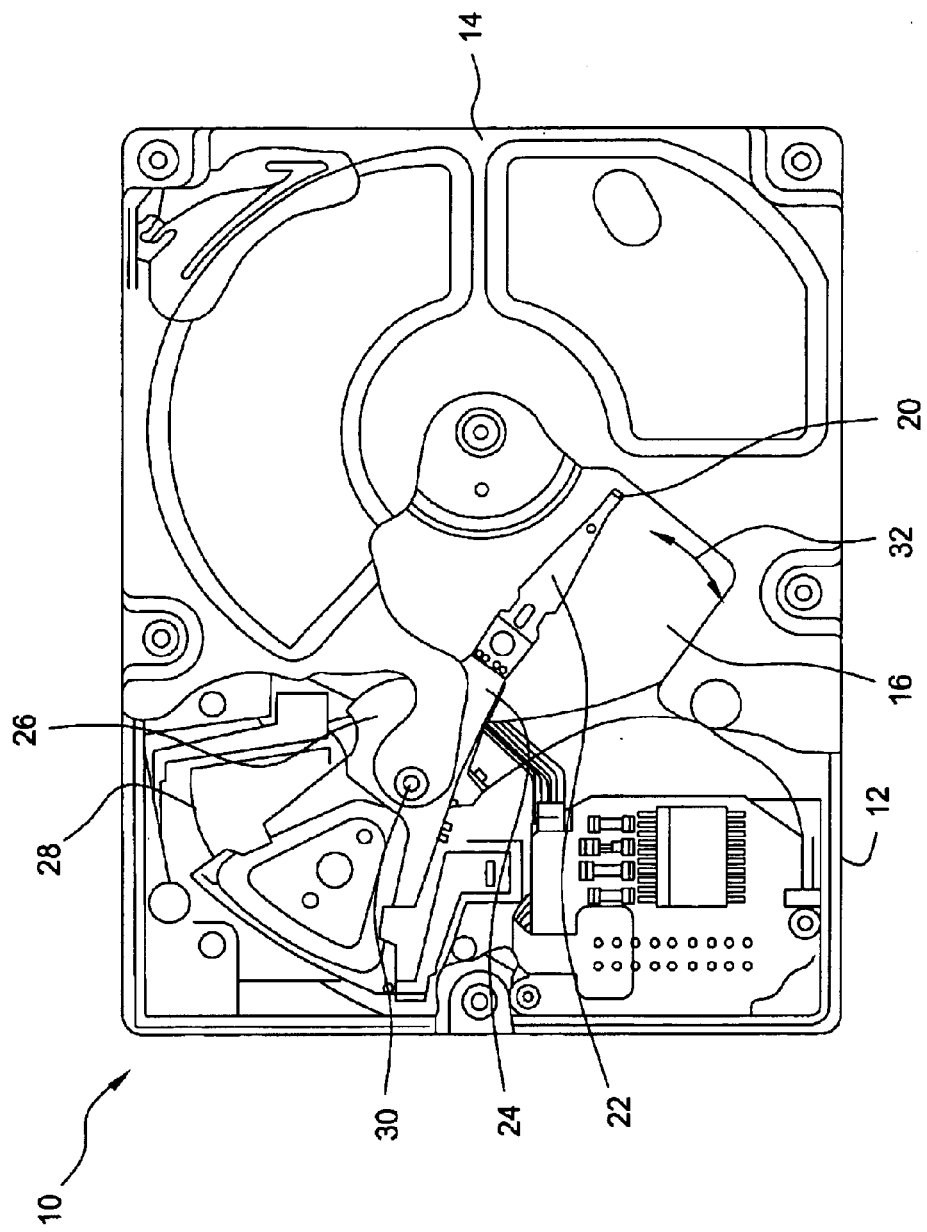
FIG. 1 depicts a plan view of one embodiment of a disk drive comprising a hydrodynamic bearing motor of the present invention.

FIG. 1 depicts a plan view of one embodiment of a disk drive 10 for use with embodiments of the invention. Referring to FIG. 1, the disk drive 10 includes a housing base 12 and a top cover 14. The housing base 12 is combined with top cover 14 to form a sealed environment to protect the internal components from contamination by elements outside the sealed environment. The base and top cover arrangement shown in FIG. 1 is well known in the industry; however, other arrangements of the housing components have frequently been used, and aspects of the invention are not limited by the particular configuration of the disk drive housing. For example, disk drives have been manufactured using a vertical split between two housing members. In such drives, that portion of the housing half which connects to the lower end of the spindle motor is analogous to base 12, while the opposite side of the same housing member (which is connected or adjacent to the top of the spindle motor) is functionally the same as top cover 14. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
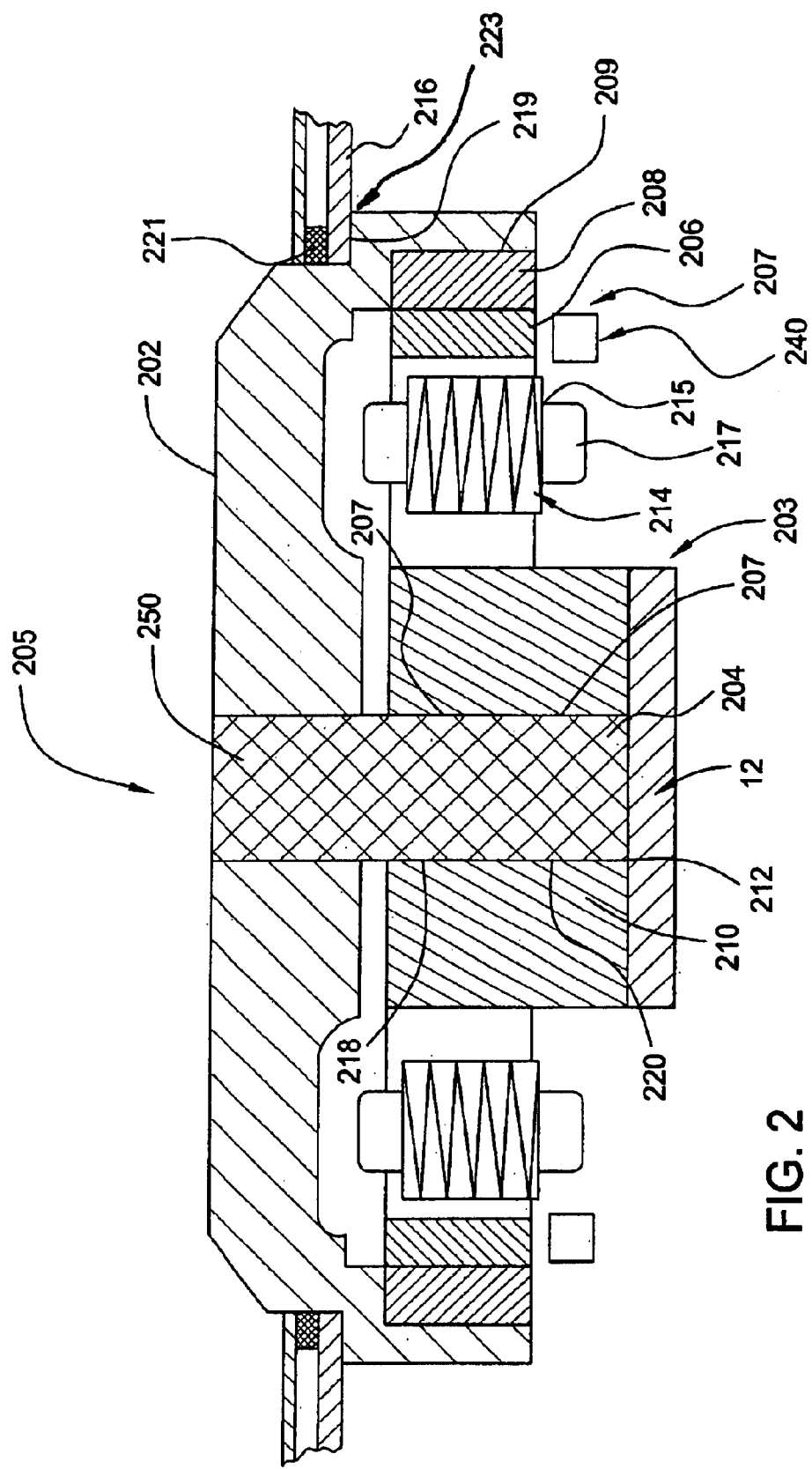
FIG. 2 is a vertical sectional view depicting a single plate hydrodynamic bearing motor according to one embodiment of the present invention.

FIG. 2 is a vertical sectional view of one embodiment of a hydrodynamic bearing motor 200 of the present invention. The motor 200 shown is a rotating shaft design comprising both rotating and stationary assemblies 203, 205. In addition, the motor also comprises a bearing assembly 207 to support stable relative rotational movement between the rotating and stationary assemblies 205, 203.

The rotating assembly 205 comprises a shaft 204 and a hub 202 mounted thereon for rotatably supporting at least one disk 216. In one embodiment, the hub 202 comprises a disk support flange 219 upon which a disk 216 is affixed. The disk 216 is affixed using an adhesive 223 such as epoxy. In an alternate embodiment, a plurality of disks 216 and spacers 221 are arranged in a stack and affixed to the hub 202 using an adhesive. Although two disks and one spacer are shown, any number of disks and spacers may be used. The shaft 204 is manufactured from stainless steel and the hub 202 is manufactured from molded plastic. The hub 202 further comprises a magnet assembly 207 having a magnet 206 supported by a back iron 208. The magnet assembly 207 is mounted to an inner, circumferential surface of the hub 202.

The stationary assembly 203 comprises a stationary sleeve 210 with a recess 212 disposed therethrough to receive the shaft 204. Mounted upon the stationary sleeve 210 is a stator 214 that, when energized, communicates with the magnet assembly in the hub 202 and, when the stator 214 is energized, induces rotation of the shaft 204 and hub 202 about the stationary sleeve 210. The stator 214 comprises a plurality of "teeth" 215 formed of a magnetic material where each of the teeth 215 is wound with a winding or wire 217.

The bearing assembly 207 comprises hydrodynamic bearings 218 and 220 comprising grooved surfaces formed on the outer diameter of the shaft 204, the inner diameter of the sleeve 210, or both. The bearings 218, 220 are defined to pump fluid in the gap between the shaft 204 and the sleeve 210 toward the base 12 of the disk drive. This prevents fluid from being lost from the open end of the gap and supports the end 205 of shaft 204 for rotation over the base 12. The end surface 205 may also have a groove pattern to support the rotation. To maintain axial alignment of the bearing system 207, magnetic bias may be established by providing a magnetic keeper 240 axially aligned with motor magnet 206, by axially offsetting magnet 206 relative to stator 215 or other appropriate magnetic bias. Such bearings are well known in the art. One particular bearing design is disclosed in commonly assigned U.S. Pat. No. 5,559,651, issued Sep. 24, 1996, which is herein incorporated by reference. The bearings support stable rotational movement of the shaft 204 within the sleeve 210.

The high cost of manufacturing a hydrodynamic bearing motor 200 is mainly due to the price of components, and more particularly due to the cost of the hub 202, shaft 204, sleeve 210, and back iron 208. Therefore, the invention provides a way to manufacture and incorporate these components in a more cost effective manner.

To reduce the cost of manufacturing the motor, the hub 202 is manufactured from molded hard plastic (for example, ultem) rather than stainless steel. For example, the shaft 204 and magnet assembly 207 can be provided to a molding vendor and molded into place in a plastic hub 202. Alternatively, the magnet assembly 207 may be affixed to the hub 202, for example using epoxy, after molding. Thus, no machining is required to construct the rotating assembly.

To further reduce costs, one or more disks 216 are affixed in place upon the hub using an adhesive such as glue or epoxy. The use of an adhesive eliminates the need for a disk clamp or threaded hole in the shaft 204 as employed by prior designs to hold disks 216 in place. As such, less components are used to lower the cost, and the lack of a hole in the shaft provides a stiffer shaft than used in the prior art.

Because the components of the motor, when fabricated as discussed herein, are relatively inexpensive, they could be manufactured to be purchased "off-the-shelf"—that is, if the geometry of these components is kept simple, stock components that are manufactured in bulk can be used, thus avoiding the use of more costly, specially manufactured parts. Therefore, the present invention represents a significant cost saving advancement in the field of single plate hydrodynamic bearing motor assembly.

While the foregoing is directed to embodiments of the invention, other and further embodiments of the invention may be devised without departing from the basic scope thereof, and the scope thereof is determined by the claims that follow.

What is claimed is:

1. Apparatus for rotatably supporting at least one disk in a disk drive, comprising:

an integrated disk support assembly having a hub and a shaft, where the hub is formed of molded plastic and the hub is molded around the shaft; and at least one disk affixed to the hub.

2. The apparatus of claim 1, wherein the shaft is formed of stainless steel and the hub is molded to be affixed to the shaft.

3. The apparatus of claim 1, wherein the hub further comprises a magnet assembly.

4. The apparatus of claim 1, wherein the at least one disk is affixed to the hub using an adhesive.

5. The apparatus according to claim 1, further comprising:

a stationary sleeve disposed axially about the shaft;

a stator mounted to the stationary sleeve; and hydrodynamic bearings formed between an inner diameter of the stationary sleeve, an outer diameter of the shaft.

6. Apparatus for rotatably supporting disks in a disk drive, comprising:

means fabricated from molded plastic for supporting at least one disk; and a shaft means, affixed to the supporting means, for supplying an axis of rotation for the supporting means, wherein the supporting means is molded around the shaft means.

7. The apparatus of claim 6, wherein the at least one disk is affixed to the supporting means using adhesive.

8. Apparatus for rotatably supporting at least one disk in a disk drive, comprising;

an integrated disk support assembly comprising a hub and shaft, where the hub is formed of molded plastic around the shaft;

at least one disk affixed to the hub;

a magnet assembly affixed to an inner circumferential surface of the hub;

a stationary sleeve for receiving the shaft;

a stator mounted to the stationary sleeve and positioned proximate the magnet assembly; and hydrodynamic bearings formed between an inner diameter of the stationary sleeve and an outer diameter of the shaft.

9. Apparatus for rotatably supporting at least one disk in a disk drive, comprising:

an integrated disk support assembly having a hub and a shaft, where the hub and shaft are formed of molded plastic; and at least one disk affixed to the hub.

10. The apparatus of claim 9, wherein the hub further comprises a magnet assembly.

11. The apparatus according to claim 9, further comprising:

a stationary sleeve disposed axially about the shaft;

a stator mounted tot eh stationary sleeve; and hydrodynamic bearings formed between an inner diameter of the stationary sleeve, an outer diameter of the shaft.

* * * * *